(12) United States Patent
Eder (10) Patent No.: US 8,104,376 B2
(45) Date of Patent: Jan. 31, 2012

(54) LABELING MACHINE (75) Inventor: Erich Eder, Donaustauf (DE)

(73) Assignee: Krones AG, Neutraubling (DE)

( * ) Notice: Subject to any disclaimer, the term of this patent is extended or adjusted under 35 U.S.C. 154(b) by 850 days.

(21) Appl. No.: 10/398,693

(22) PCT Filed: Sep. 14, 2002

(86) PCT No.: PCT/EP02/10338
§ 371 (c)(1),
(2), (4) Date: Jul. 3, 2003

(87) PCT Pub. No.: WO03/024861
PCT Pub. Date: Mar. 27, 2003

(65) Prior Publication Data
US 2004/0099379 A1 May 27, 2004

(30) Foreign Application Priority Data
Sep. 14, 2001 (DE) .................................. 101 45 455

(51) Int. Cl.
*B23Q 16/00* (2006.01)
(52) U.S. Cl. ................................................ 74/813 R
(58) Field of Classification Search .............. 74/813 R; 156/567, 568
See application file for complete search history.

(56) References Cited

U.S. PATENT DOCUMENTS

| | | | | |
|---|---|---|---|---|
| 2,657,816 A * | 11/1953 | Everett | ............................ | 156/481 |
| 2,967,384 A * | 1/1961 | Wilson | ............................... | 53/76 |
| 4,362,594 A | 12/1982 | Nagano et al. | | |
| 4,460,432 A | 7/1984 | Jörss | | |
| 4,479,343 A | 10/1984 | Tincati | | |
| 4,642,971 A * | 2/1987 | Gilkey | ............................ | 53/435 |
| 4,833,865 A * | 5/1989 | Chong | ............................ | 53/517 |
| 5,078,826 A | 1/1992 | Rogall | | |
| 5,259,913 A * | 11/1993 | Stover | ............................ | 156/566 |
| 5,425,823 A | 6/1995 | Woodside, III | | |
| 5,478,422 A | 12/1995 | Bright et al. | | |

FOREIGN PATENT DOCUMENTS

| | | |
|---|---|---|
| DE | 3134661 | 3/1983 |
| DE | 3307662 | 9/1984 |
| DE | 3614447 A1 * | 3/1987 |
| DE | 8905836.4 | 4/1989 |
| DE | 4120887 | 6/1992 |
| DE | 3327492 | 2/1995 |

(Continued)

OTHER PUBLICATIONS

Merriam-Webster's Collegiate Dictionary, 10th Edition, Merriam Webster, p. 465.*

(Continued)

*Primary Examiner* — Vicky Johnson
(74) *Attorney, Agent, or Firm* — Marshall, Gerstein & Borun LLP (57) ABSTRACT

The invention relates to a machine for the labeling of items, such as containers or the like, with at least one carousel, at least one labeling unit for the labeling of the items positioned on its periphery, and synchronously drivable transport elements for the feeding and removing of the items in a manner adjusted to position, whereby the transport elements are supported on a table plate, and the carousel is supported in a rotary bearing positioned outside the table plate.

55 Claims, 6 Drawing Sheets

FOREIGN PATENT DOCUMENTS

| | | |
|---|---|---|
| DE | 19741476 | 3/1999 |
| EP | 0805109 | 11/1997 |
| EP | 1097871 | 5/2001 |
| GB | 944922 | 6/1956 |
| JP | 53107500 | 9/1978 |
| JP | 1139330 A | 5/1989 |
| JP | 555393 | 7/1993 |
| JP | 05262389 | 10/1993 |
| JP | 6179528 A | 6/1994 |
| JP | 07002295 | 1/1995 |
| JP | 200044051 A | 8/2000 |

OTHER PUBLICATIONS

Merriam-Webster's Collegiate Dictionary, 10th Edition, Merriam Webster, p. 465, 1999.*

* cited by examiner

LABELING MACHINE

The invention relates to a machine for the labeling of items (bottles, boxes, or the like) in accordance with the introductory portion of claim 1 or 22, respectively.

In conventionally-designed labeling machines, all essential assembly units (carousel, transport elements, labeling units, etc.) are located on a large common table plate which forms the base of the machine, so to speak. The space-consuming construction type and poor accessibility to the individual assembly units, which makes maintenance and cleaning works more difficult, is disadvantageous.

It has already been proposed, by DE 31 34 661 A1, to support a centrally free processing carousel, along with the transport elements for the supplying and removing of the items [to be labeled] as well as the labeling units, on a shortened table plate (FIG. 3). Despite the proposed shortening, the remaining table plate is always still relatively large and expensive. The primary disadvantage, however, is the lack of flexibility in regard to later changes of the machine configuration, as is the case in most conventionally-designed labeling machines. These are, as a rule, connected with a considerable expense, so that a new machine is frequently more cost-effective than an extensive modification of an existing machine.

Figure 1:
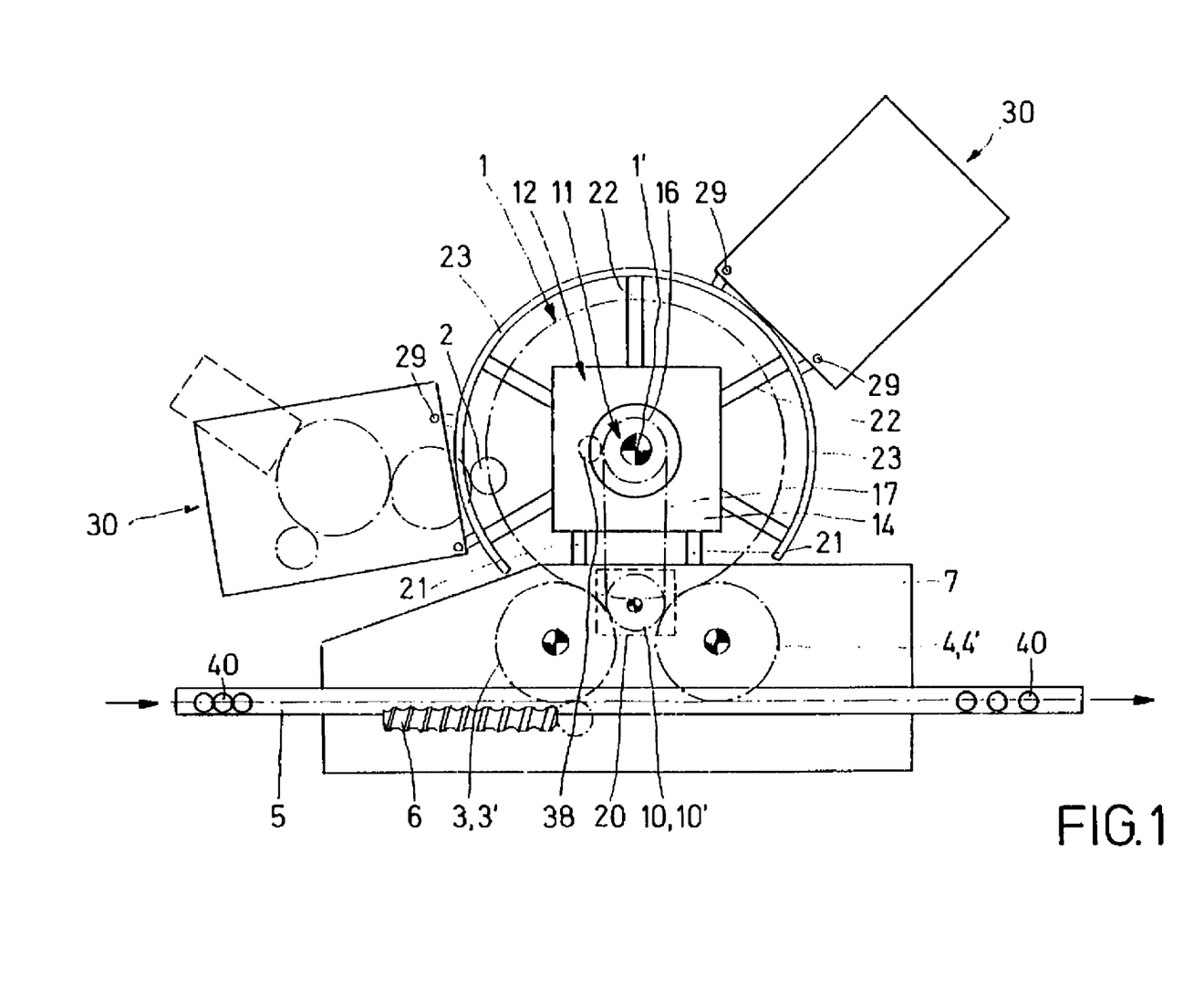
FIG. 1: A view of a labeling machine from above, in a schematic depiction.

It is additionally known from DE 197 41 476 A1 to position the processing carousel, the transport elements for the supplying and removing of the items to be labeled, as well as the labeling units in a labeling machine each separately on their own underframes (FIG. 4), rather than on a common table plate (FIG. 1). This system offers advantages for the user in relation to a flexible module construction type if all of the above-stated elements of the machine can each be acted on by its own motor drive, but brings about increased expenditure in terms of drive technology, however.

On the other hand, the task which forms the basis for the invention is that of describing a simple and cost-effective machine for the labeling of items which has high flexibility and good accessibility.

This task is solved by the characterizing features of claim 1 or 22, respectively.

Through the fact that only the transport elements (intake- and discharge star wheels, adjusting helix, conveyor belts) supplying and removing the items to and from the carousel are supported on a common table plate, it can be advantageously kept very compact, whereby the drive elements (motor, toothed wheels, traction mechanism gear, shafts, or the like) can be attached, in a more favorable manner, to the lower side of the table plate, while the actual carousel for the processing of the items during the labeling process, with its rotary bearing outside the table plate, is positioned separately by itself on its own support frame.

This solution makes it possible to obtain a cost-favorable drive system of the transport elements with only one motor drive, while the further distribution of the force transmission is carried out, in the manner mentioned, by means of mechanical elements. At the same time, a good accessibility of the free-standing processing carousel, and of the individual and likewise free-standing labeling units, which can be placed on the circumference of the carousel at any positions desired, depending on the equipment variants desired, is provided. These labeling units can be of different construction types (wet glue unit, hot glue unit, issuing units for self-adhering labels, labeling units for roll labels, or the like) and each one has its own underframe, if necessary, as well as at least one motor drive of its own.

Elements for fixing the relative position of the labeling units, the brushing elements, and any additional machine components to the carousel are present on the periphery of the carousel, which elements, in addition to the radial distance, also determine the height, the inclination, and the position on the circumference of the carousel. A complicated and imprecise attachment of the stated components to the floor of the manufacturing hall in order to fix the relative positions can thereby be dispensed with. Horizontal brackets, or brackets which can be adjusted in the circumferential direction on the rotary bearing or frame of the carousel, if necessary, are suitable for this. A ring-shaped construction of the element which is adjusted to the circumference of the carousel is particularly favorable, since any continuous circumferential positionings desired can easily be achieved by that means. This solution makes a rapid change of the labeling units and of additional format parts, such as brushing elements or the like, if necessary, possible for the user of a machine if a conversion to a different equipment or bottle size is supposed to take place, particularly in connection with preset changeable coupling elements which guarantee a rapid and precise self-centering of the corresponding components.

Because of this concept, a high flexibility for the user of the machine, as well as a simplification of the production and set-up for the producer of the machine, in addition to the outstanding accessibility, are provided by the individual machine modules, which can, if needed, be combined in a changeable or individual manner, as the case may be.

The separately-standing rotary bearing of the carousel can be formed by a table-like frame construction, and can have inclined surfaces for the improved removal of fluid and dirt, if necessary, as the result of which the cleaning of the machine is facilitated.

The external contour of the table-like frame construction is advantageously designed to be smaller than the outer periphery of the carousel, and does not project over this in the radial direction. A good accessibility to the carousel is guaranteed by that means. Only one ring encircling the carousel in at least a partially circumferential manner (from the item intake point to the item discharge point) projects slightly over the carousel into a level positioned deeper in the radial direction, as the result of which straight support units for the holding of machine parts, such as protective casings, brushing bodies, or the like, can be advantageously placed directly on the ring without contact with the base, and can be attached, in a detachable and adjustable manner, at any time. Free-standing labeling units can also be fixed to any circumferential positionings on this ring that are desired. This advantage then also comes to bear if the above-stated frame construction of the carousel and the table plate for the transport elements are designed as a single part, or if these are connected with one another in an undetachable manner.

Further advantageous configurations are the object of the remaining sub-claims.

One preferred example of implementation is illustrated in the following by means of the figures. These depict the following:

FIG. 3-*a* to 3-*c*: Several variants of a labeling machine, in a schematic view from above;

The labeling machine has a carousel (1), which is only indicated by a partial circle in FIG. 1, and has several rotary plates (2) positioned at uniform spacing distances. Furthermore, an intake star wheel (3) and a discharge star wheel (4), the partial circles of which are each in contact with the partial circle of the carousel (1), are additionally present. Both star wheels (3 and 4) are, for the purpose of greater clarity, likewise only indicated in FIG. 1 by their partial circles. On the side of the star wheels (3 and 4) oriented away from the carousel (1), a straight-line conveyor belt (5) is positioned in contact with the partial circles of the same [star wheels], on which [conveyor belt] an adjusting helix (6) oriented in parallel is positioned at the side, in the area in front of the intake star wheel (3). The adjusting helix (6), the conveyor belt (5), and the star wheels (3, 4) are positioned or supported on a common table plate (7).

The star wheels (3, 4) are non-rotatably connected, by way of vertical shafts, with toothed wheels (3', 4') which are supported in a rotatable manner under the table plate (7) and have partial circle diameters in agreement with the partial circles of the star wheels, which [toothed wheels], for their part, mesh with the toothed drive wheel (10) of an electromotive primary machine drive (20), such as an asynchronous motor with reduction gear which can be adjusted in its rotational speed, for example. A toothed belt pulley (10') connected with [the toothed drive wheel (10)] in a non-rotating manner, which [toothed belt pulley] engages, by way of a toothed wheel (17), with a toothed belt pulley (16) serving for the driving of the carousel (1), is positioned coaxially with the toothed drive wheel (10). The driving of the adjusting helix (6), as well as of the conveyor belt (5), if applicable, is carried out from the primary machine drive (20) by means of mechanical force transmission elements (toothed wheels, tooth belts, and universal shafts), not depicted in detail, by way of one of the above-stated toothed wheels. It is to be understood that the primary machine drive could, in an alternative manner, also be directly assigned to the carousel (1), or both the table (7) as well as the carousel (1) could each have its own motor, each of which is synchronized with the other, whereby the tooth belt (17) could then be omitted.

The rotational axis (1') of the carousel (1), which is formed by a vertical central shaft (1-c), is accommodated by a rotary bearing (11), which is positioned next to the table plate (7) standing separately by itself. This rotary bearing (11), which has a frame (12) designed in a table-like manner, can best be seen in FIG. 2. As depicted there, the frame (12), which stands on support feet (15), supports the central shaft (1-c) in an internally hollow support column (13) which is integrally formed or placed on. The central shaft (1-c) can be driven by means of a toothed belt pulley (16) which is attached, on its lower end, in a non-rotating manner.

Figure 2:
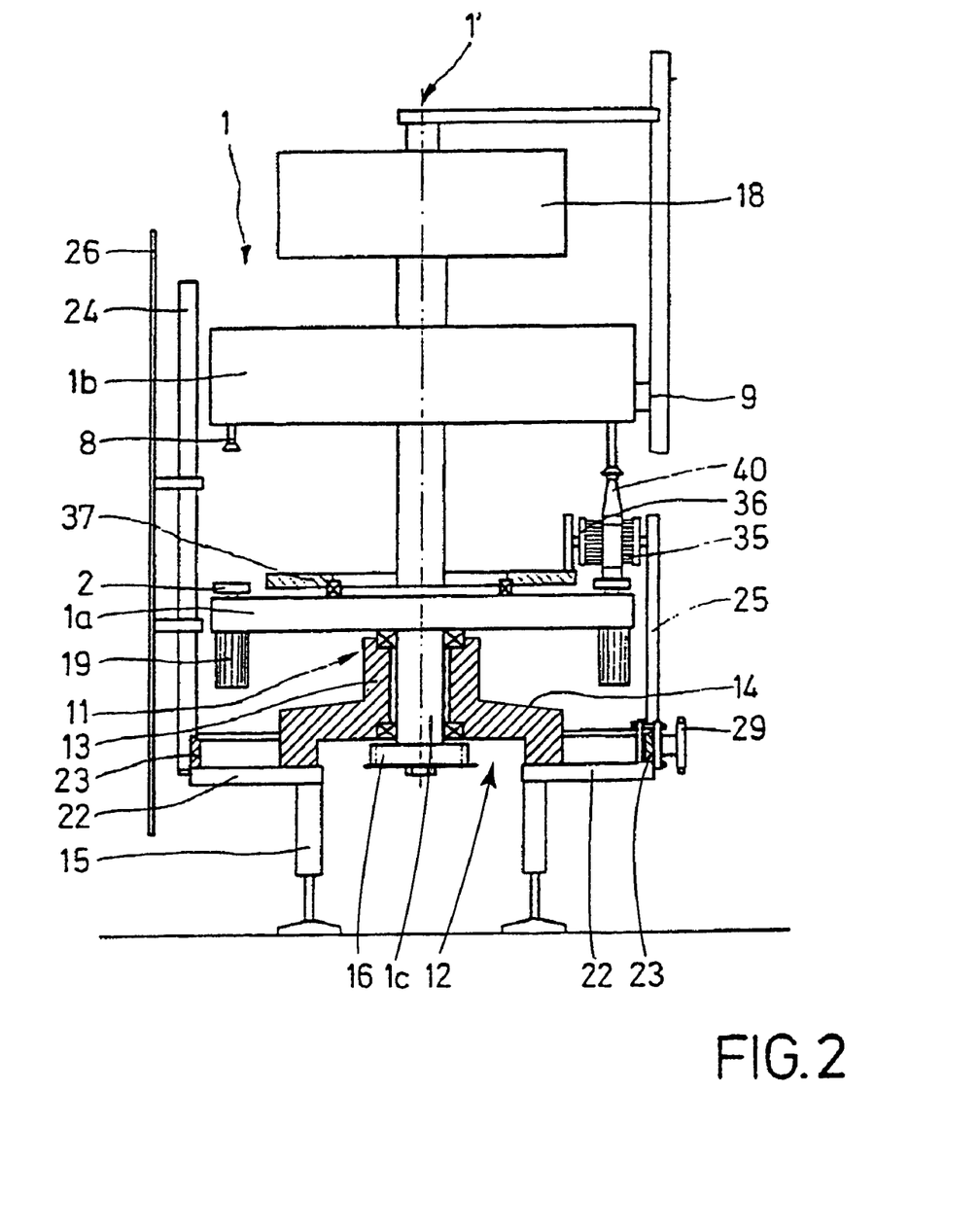
FIG. 2: A side view of the carousel of the labeling machine in accordance with FIG. 1, in a partially cut-away depiction.

Among other features, a rotary plate (1-a) and an upper part (1-b) of the carousel (1), which is positioned above [the rotary plate] and is adjustable in height, if necessary, is supported in a non-rotating manner on the central shaft (1-c). A casing (18) for the control unit of servomotors (19), which are positioned on the lower side of the rotary plate (1-a) and serve for the program-controlled driving of the rotary plates (2), which are rotatably supported on the rotating table (1-a), is located on the upper end of the central shaft (1-c). A centering bell (8), which can be raised and lowered in the upper part (1-b) of the carousel (1), which [centering bell] can be activated in the known manner by means of a control cam, not depicted, is coordinated with each rotary plate (2). In order to secure the control cam from jointly rotating, a torque support unit fixed to the frame (9) is present.

For the coordination of the carousel (1) in a correct position with the star wheels (3 and 4), the frame (12) of the rotary bearing (11) is connected with the table plate (7) by means of two supports (21) that bridge over the intermediate space that is present, particularly in a detachable manner, such as by means of threaded joints, fitting rods, or other suitable elements, for example. The connection is facilitated through the positioning of the table plate (7) and the table plate (14) of the frame (12), which are both configured horizontally with an even surface, at equal heights.

Figure 5:
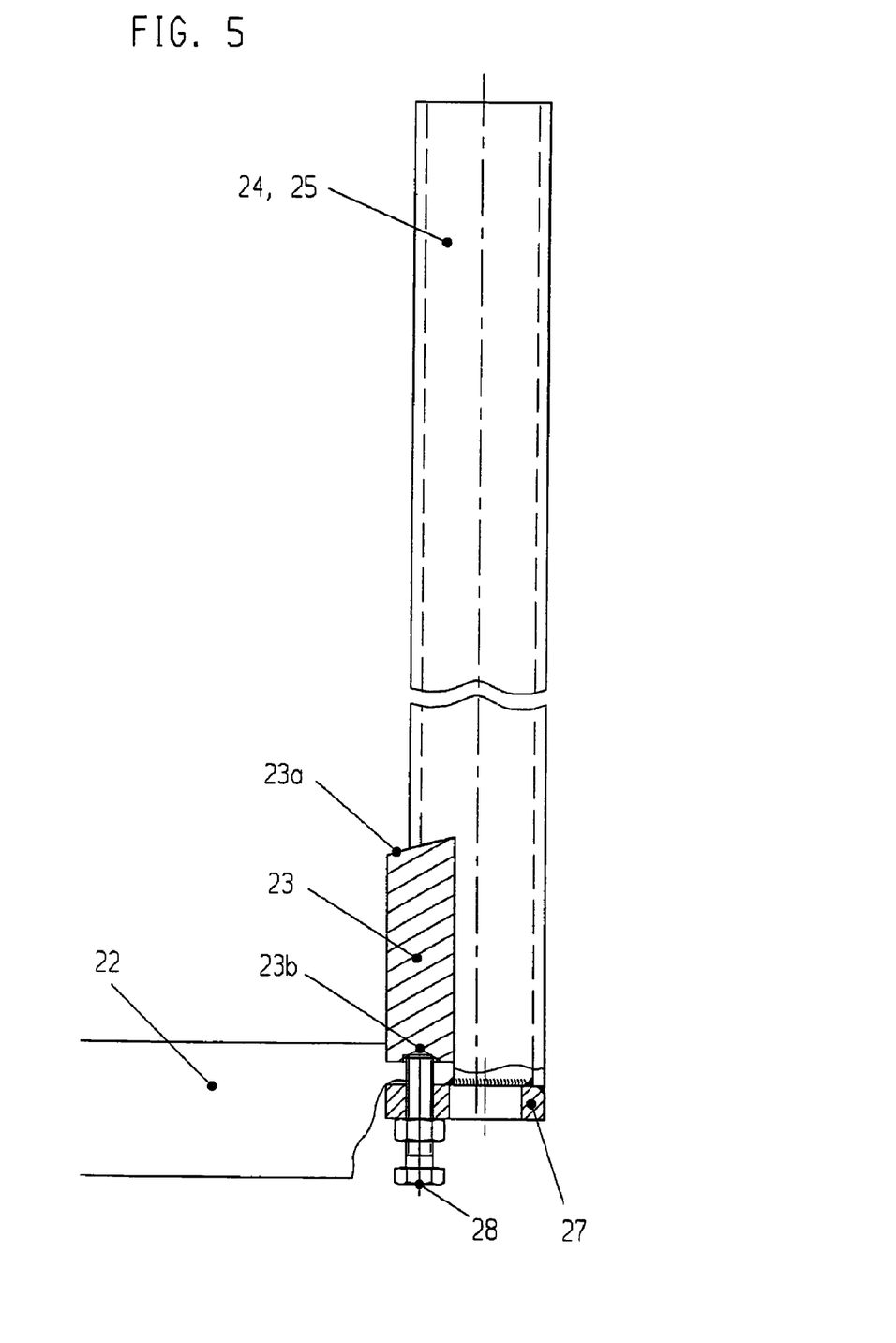
FIG. 5: A detail of the labeling machine from FIG. 2, in an enlarged depiction.

Several brackets (22) extending horizontally radially outwardly are attached to the lower side of the table plate (14) of the frame (12) of the rotary bearing (11), which [brackets] support a ring (23) encircling the carousel (1), at least over partial circumference. This ring (23), which has a larger diameter than the rotary plate (1-a) and lies below this [rotary plate], extends, in the circumferential direction, to close to the edges of the table plate (7) and is provided, on its upper edge, with an inclined surface (23-a) dropping off radially inwardly, while the lower edge is provided with a V-shaped groove (23-b) proceeding in the circumferential direction (FIG. 5). Labeling units (30) can be connected with the radial outer side of the ring (23) at any chosen point. In order to guarantee a rapid changing of the labeling unit (30), on the one hand, and a precise—that is to say, reproducible—positioning to the carousel (1), on the other hand, detachable coupling elements with a centering function are provided in pairs. These are designed, for example, as vertical bolts or pins (29) on which a labeling unit (30) which has a fitting boring (29-a), or the underframe (31) of the same, can be suspended. The stated pins (29) can be attached in a rigid manner, by means of clamping plates or the like, to any desired point of the ring (23). It would, however, be conceivable to movably support the pins (29) for the linking of the labeling units, such as in a vertically displaceable manner, for example, through which a stroke movement of the labeling unit for the attaching or removing can be dispensed with.

Figure 4:
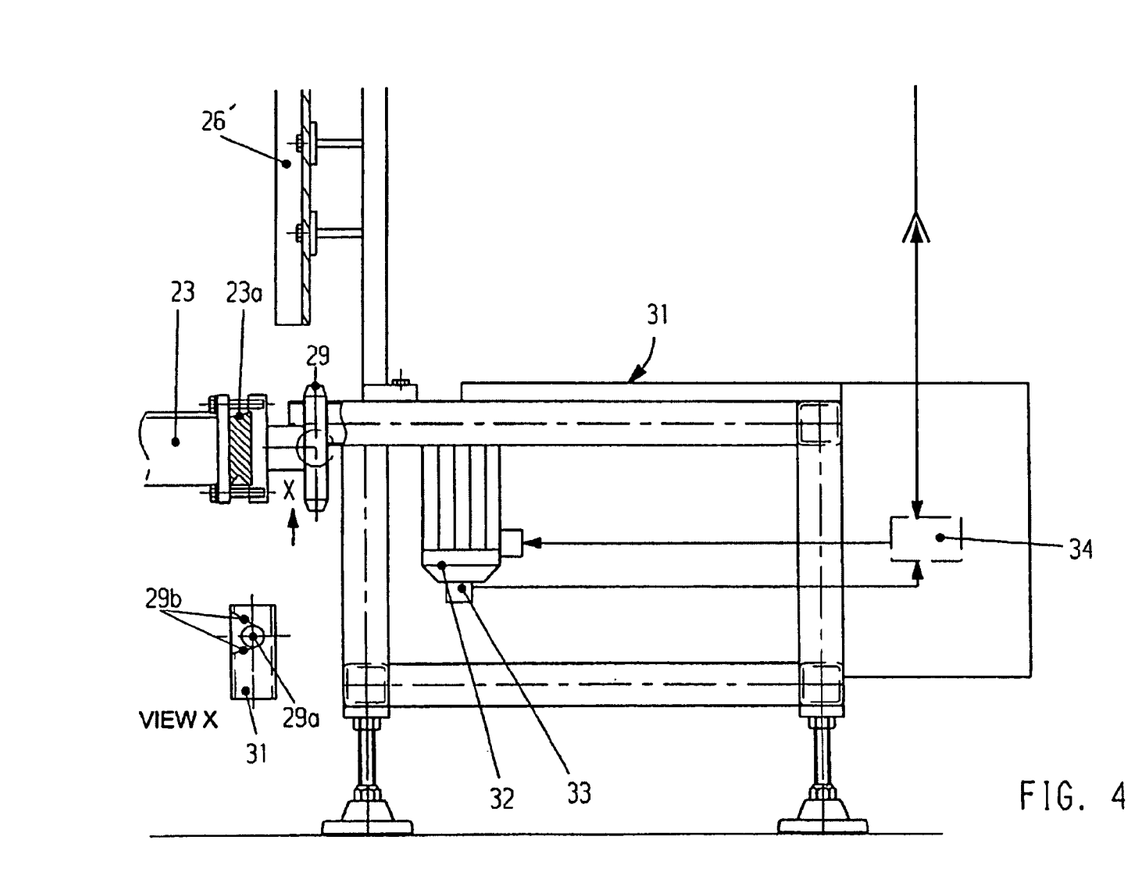
FIG. 4: An underframe of a labeling unit, in an enlarged depiction.

As is evident from FIG. 4, the underframe (31) of a labeling unit has a square tube with borings (29-a) on its side which is oriented towards the ring (23), and displaces V-shaped inclined feeding units (29-b) positioned under the same which are open to the ring (23). This detailed view, marked with an "X", is depicted in a view from below. By means of a pallet-lifting truck or fork-lift, the underframe (31) can be raised far enough for the suspension on the pins (29) that the borings (29-a) are located above the, but the inclined feeding units (29-b) are located further below the upper end of the pin (29), however. By means of a radial moving forward on the pins (29), the inclined feeding units (29-b) center the underframe (31) until the borings (29-a) align axially with the pins (29). In this position, the borings (29-a) are brought into engagement with the pins (29) in a form-locking manner through the lowering of the underframe (31). The exact height and inclination can be adjusted by means of foot units on the underframe (31), which are individually adjustable in height.

Furthermore, a protective disk (26'), the external contour of which is adjusted to a cross-section in a protective disk (26) encircling the carousel in an extensive manner, is attached to the underframe (31) on the side oriented towards to the carousel (1). Likewise, on the side oriented towards the carousel (1), self-adhesive elements (sponge surfaces, rollers, or brush bodies), not depicted, for the integral forming of labels to the bottles (40) or the like, can be attached to the underframe (31), particularly—viewed from the carousel (1)—in front of the protective disk (26'). Upon a change of a labeling unit, the self-adhesive elements fitting to the specific contour of the bottle are also, in an advantageous manner, always automatically provided by that means. For the purpose of better clarity, the labeling unit is not depicted in FIG. 4.

The ring (23) functions, furthermore, as a support for support units (24, 25) positioned standing vertically on it, whereby support units (24) serve as holding devices for protective disks (26) encircling the carousel (1) in an extensive manner, which [protective disks] are guided along the support units (24) in a raisable and lowerable manner, and support units (25) which are provided as holding devices for external brush bodies (35) for applying labels to the contour of the bottle. In order to hold internally-positioned brush bodies (36), a support disk (37) is, supported on the rotating table (1-a) and secured against rotation. The support units (24, 25) have, on their lower ends, diagonal reliefs fitting in a form-locking manner with the diagonal surface (23-a) of the ring (23), so that these are oriented in the axial and radial direction to the ring (23) and are fixed, in a radial and axial manner, by means of a locking screw (28) or other detachable attachment engaging in the groove (23-b) and held in a plate (27) which is attached to the lower end of the support units and secures the ring. The torque support units (9) already mentioned can, in the same manner, also be attached to the ring (23) in a non-rotating manner (see FIG. 5).

The labeling units (30) each have their own underframe (31) which can, if necessary, be designed in a portable manner, with wheels. The underframe (31) has, in addition, a plate supporting the labeling unit (30) and a casing, within which an electromotive drive (32), with its coordinated control unit (34), is accommodated. This control unit (34) is designed in such a manner that it subsequently controls the drive of the labeling unit (30) in a manner adjusted to position, that is to say, in a manner that is synchronous, in position and speed, with the continuous rotational movement of the carousel (1). The drive (32) can be a frequency-controlled asynchronous motor with a rotation coordinating unit (33) for the feedback of actual value to the control unit (34). A rotation coordinating unit (38) serving as a set-point transmitter is located on the carousel (1), which [rotation coordinating unit], upon one rotation of the carousel (1) by a spacing distance of two adjacent rotary plates (2), supplies 5000 cycles or impulses, for example, to the input of the control unit (34) of the unit drive (32), through which a regulated synchronism between the labeling unit (30) and the carousel (1), accurate in rotary angle with a pre-settable transmission ratio, can be achieved. Each labeling unit (30) can be equipped with rapidly detachable plug connections for the supplying of power and compressed air, as well as signal transmission. For the fine tuning of the position of a labeling unit (30), it can be supported radially, tangentially, and adjustable in its height relative to the rotating table (1-a) on its underframe (31), or on the plate of the same.

Figure 3A:
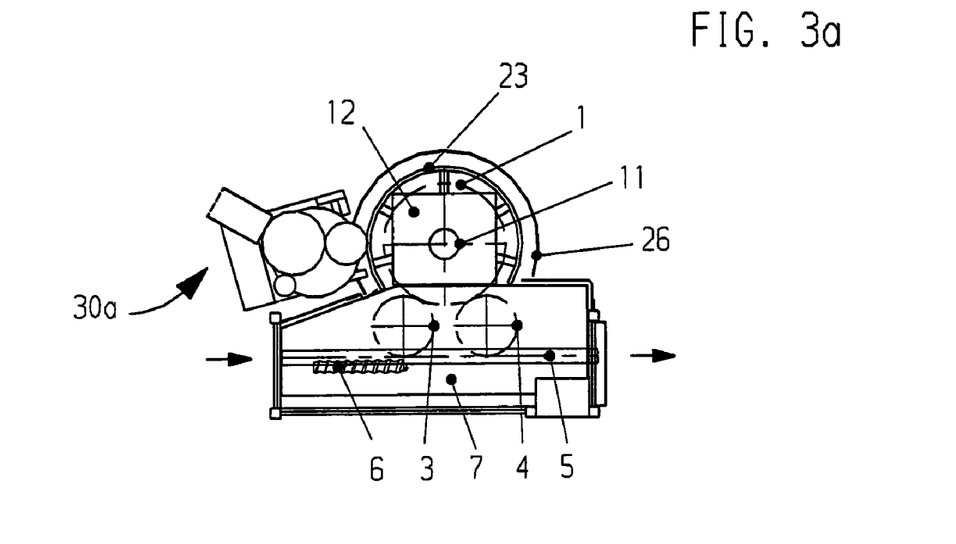
Figure 3B:
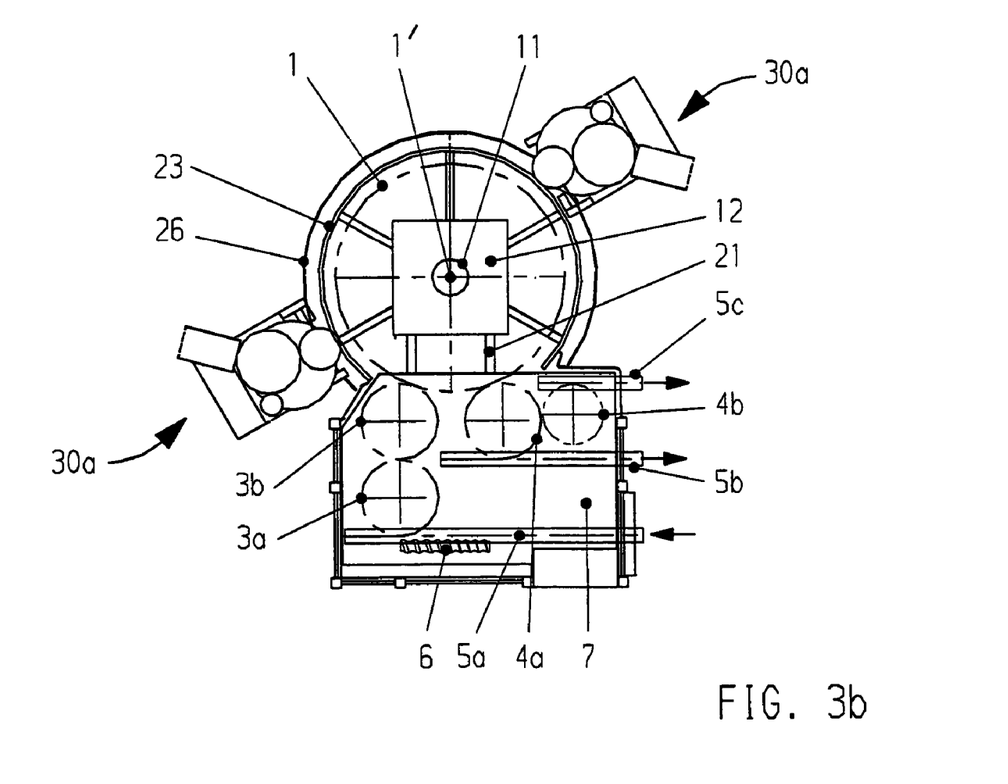
Figure 3C:
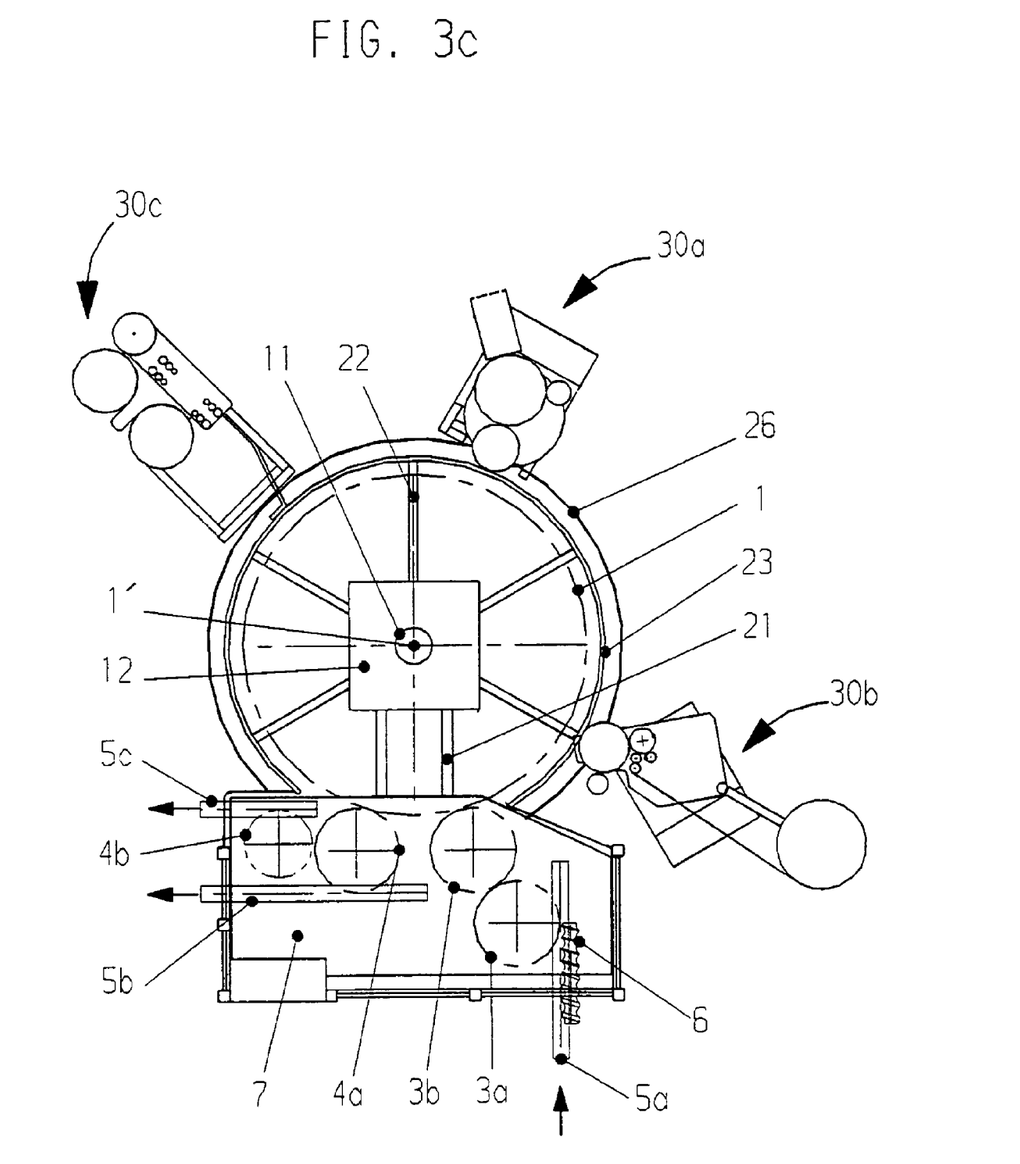

The variability of the machine design is visible from the sequence of diagrams (3-a to 3-d). A carousel (1) that is present can be combined, in any manner desired, with a differently-formed intake- and discharge configuration. There can be provided next to a carousel (1), for example, a table plate (7) with two star wheels (3, 4) for the straight transport of the bottles (5) proceeding in an aligning manner in one direction of conveying (FIG. 3-a), or a table plate (7) with three or more star wheels (3-a, 3-b, 4-a, 4-b) for an angular [transport of the bottles] (FIG. 3-c), or a parallel transport of the bottles in the opposite direction, if necessary (5-a, 5-b, 5-c) (FIG. 3-b).

For the user of such a type of machine, the advantage results from that, upon a change of an existing layout of a bottle filling line, the labeling machine can be flexibly adjusted by changing the table plate (7), or the entire intake- and discharge areas, and by adding a new plate upon the further use of the carousel (1) and of the labeling unit, without purchasing a new machine. Wet glue labeling units (30-a), roll labeling units (30-b), and issuing units (30-c) for self-adhering labels can be combined or exchanged in any manner desired. The wet glue labeling units (30-a) can be designed in a manner corresponding to DE 197 41 476 A1, that is to say, with rotating or oscillating adhesive surfaces for the removal of labels. Each of these adhesive surfaces can be activated, if necessary, by its own, program-controllable electromotive drive.

The case may arise, on the other hand, that only the carousel (1) is to be changed; for example, a small carousel is replaced by one with a larger diameter if other [labels], or more labels than previously, are to be attached to a bottle (40), for which a longer processing line may be necessary. In this case, the labeling units and the table plate (7) can be retained with the bottle intake- and discharge. Supports (21) with corresponding length and adjusted to the carousel diameter must be provided, however.

The invention claimed is:

1. A machine for the labeling of items, comprising at least one carousel, a ring encircling the carousel, at least one labeling unit for the labeling of items connected to the ring at any chosen point, synchronously driven transport elements for correctly positioned delivery and removal of the items, the transport elements being supported on a table plate, and the carousel being supported in a rotary bearing positioned outside the table plate, wherein the at least one labeling unit has an underframe and wherein the at least one labeling unit can be detachably docked at the periphery of the at least one carousel, wherein one of the labeling units and the underframe support one of a protective disk and pressing elements and wherein the labeling units have their own electromotive drive synchronized for the movement of the carousel.

2. A machine in accordance with claim 1, wherein the rotary bearing has a standing frame, formed as a table plate separate from the table plate.

3. A machine in accordance with claim 2, wherein the vertical projection surface of the frame supporting the carousel is smaller than that of the carousel.

4. A machine in accordance with claim 2, wherein the table plate of the frame has an external contour lying within the circumference of the carousel.

5. A machine in accordance with claim 2, wherein brackets projecting radially outwardly, which project beyond the circumference of the carousel, are attached to the frame.

6. A machine in accordance with claim 5, wherein the brackets one of directly and indirectly hold or carry at least one protective casing encircling the carousel in a partially extensive manner.

7. A machine in accordance with claim 5, wherein the brackets support the ring encircling the carousel.

8. A machine in accordance with claim 7, and labeling units, which can be placed on the circumference of the carousel as desired, are linked with the ring.

9. A machine in accordance with claim 8, wherein the labeling units are linked with the ring by means of detachable coupling elements.

10. A machine in accordance with claim 7, and wherein the ring encircles the carousel at least in a partially extensive manner.

11. A machine in accordance with claim 7, wherein the ring has a larger diameter than the carousel.

12. A machine in accordance with claim 2, wherein the position of the table plates can be fixed to one another by means of connection elements.

13. A machine in accordance with claim 12, wherein the table plates are positioned relative to one another at a distance forming a free interstitial gap between them.

14. A machine in accordance with claim 12, wherein the upper side of the table plates has inclined surfaces.

15. A machine in accordance with claim 12, wherein drive elements for the carousel are supported on the frame and drive elements for the transport elements are supported on the table plate supporting the transport elements.

16. A machine in accordance with claim 12, and a drive motor is positioned on one of the table plates, and force transmission elements are present between both table plates.

17. A machine in accordance with claim 12, wherein the table plate for the transport elements supports at least one feeding device and at least one removing device for the items.

18. A machine in accordance with claim 17, wherein the feeding device and removing device are positioned in a manner aligning to one another.

19. A machine in accordance with claim 17, wherein the feeding device and removing device are arranged in parallel.

20. A machine in accordance with claim 19, wherein the feeding device and removing device are positioned in parallel in an opposing direction of conveying.

21. A machine in accordance with claim 19, wherein the transversely positioned feeding device and removing device proceed in a rectangular manner.

22. A machine in accordance with claim 17, wherein the feeding device and removing device are positioned transversely to one another.

23. A machine in accordance with claim 12, wherein the connection elements are detachable.

24. A machine in accordance with claim 1, wherein the transport elements are one of star wheels, conveyor belts, conveying helixes, and transport belts.

25. A machine in accordance with claim 1, wherein each labeling unit has detachable plug-in couplings for electrical power supply, exchange of signals with a machine control unit, and the provision of compressed air.

26. A machine in accordance with claim 2, wherein the table plate has a support column which is one of integrally formed with and placed thereon.

27. A machine in accordance with claim 1, wherein the electromotive drives have a control unit integrated into the underframe of the labeling unit.

28. A machine for the labeling of items, comprising at least one carousel, a ring encircling the carousel, at least one labeling unit for the labeling of the items and connected to the ring at any chosen point, and synchronously driven transport elements for feeding and removing the items, wherein the labeling units have their own electromotive drives synchronized for the movements of the carousel, and a control unit for the electromotive drives which is integrated into a displaceably designed underframe supporting the labeling units, whereby the underframe is linked to the ring by means of detachable, self-centering coupling elements.

29. A machine in accordance with claim 28, wherein the carousel has a frame, and the ring is fixed to the frame with brackets or supports.

30. A machine in accordance with claim 29, wherein the ring directly or indirectly holds or supports at least one protective casing encircling the carousel in a partially extensive manner.

31. A machine in accordance with claim 29, wherein the brackets and supports project radially outwardly over the circumference of the carousel.

32. A machine in accordance with claim 28, wherein the ring encircles the carousel in an at least partially extensive manner.

33. A machine in accordance with claim 32, wherein the ring is supported by brackets projecting radially outwardly from the frame of the carousel.

34. A machine in accordance with claim 32, wherein the ring has a larger diameter than the carousel.

35. A machine in accordance with claim 32, wherein the labeling units are detachably linked to the ring.

36. A machine in accordance with claim 32, wherein the cross-section of the ring is such that the radial distance to the carousel, or the inclination or the height of the components that can be attached to the carousel can be fixed in a self-centering manner by means of form-locking.

37. A machine in accordance with claim 36, wherein the ring has an upper surface inclined to the horizontal proceeding in the circumferential direction.

38. A machine in accordance with claim 36, wherein the ring has a lower side with at least one inclined surface.

39. A machine in accordance with claim 38, wherein the inclined surface comprises a V-shaped groove proceeding in the circumferential direction.

40. A machine in accordance with claim 28, wherein each labeling unit has detachable plug-in couplings for an electrical power supply, an exchange of signals with a machine control unit, and a provision of compressed air.

41. A machine in accordance with claim 28, wherein the transport elements are supported on a table plate, and the carousel is supported in a rotary bearing positioned outside the table plate.

42. A machine in accordance with claim 41, wherein the rotary bearing has a separately-standing, table-like frame.

43. A machine in accordance with claim 42, wherein the frame comprises a table plate with a support column one of integrally formed therewith or placed thereon.

44. A machine in accordance with claim 43, wherein the position of the table plates to one another can be fixed by detachable elements.

45. A machine in accordance with claim 28, wherein the labeling units have an underframe and one of the labeling units and the underframe support one of a protective disk and self-adhesive elements.

46. A machine in accordance with claim 28, wherein the at least one labeling includes self-centering coupling elements.

47. A machine in accordance with claim 28, wherein the elements include bolts or pins and the labeling unit includes bores.

48. A machine in accordance with claim 47, wherein the labeling unit or a underframe of the labeling unit can be suspended on the bolts or pins.

49. A machine in accordance with claim 48, wherein one of the labeling unit and the underframe are placed by a lifting movement into a position above the frame-mounted elements at the periphery of the carousel and positively attached thereto by subsequent lowering.

50. A machine in accordance with claim 48, wherein the bolts or pins are movably mounted and vertically displaceable.

51. A machine in accordance with claim 28, wherein the labeling unit or a underframe thereof includes inserting slants relative to the carousel for centering the labeling unit or the underframe which supports the labeling unit.

52. A machine in accordance with claim 28, wherein the labeling unit is supported by an adjustable underframe, of which at least one of a height and slant is adjustable.

53. A machine in accordance with claim 28, wherein the labeling unit is supported by a underframe which is mounted so as to be adjustable in at least one of a radial and a height direction relative to the carousel.

54. A machine in accordance with claim 28, wherein the carousel and the transport elements are arranged on a table top the outside of which is designed in such a manner that the at least one labeling unit can be placed in an area of an article inlet up to an article outlet.

55. A machine for the labeling of items, comprising at least one carousel, a ring encircling the carousel, at least one labeling unit for the labeling of items connected to the ring at any chosen point, synchronously driven transport elements for correctly positioned delivery and removal of the items, the transport elements being supported on a table plate, and the carousel being supported in a rotary bearing positioned outside the table plate, wherein the at least one labeling unit has an underframe and wherein the at least one labeling unit can be detachably docked at the periphery of the at least one carousel, wherein the rotary bearing has a standing frame, formed as a table plate separate from the table plate, wherein brackets projecting radially outwardly, which project beyond the circumference of the carousel, are attached to the frame, and wherein the brackets support the ring encircling the carousel, and labeling units, which can be placed on the circumference of the carousel as desired, are linked with the ring by means of detachable coupling elements, wherein the coupling elements are self-centering.

* * * * *